Sept. 23, 1947.  J. C. CLIFTON ET AL  2,427,902
APPARATUS FOR THE GRAVITATIONAL CONTROL OF PHOTO-ELECTRIC CELLS
Filed May 3, 1944
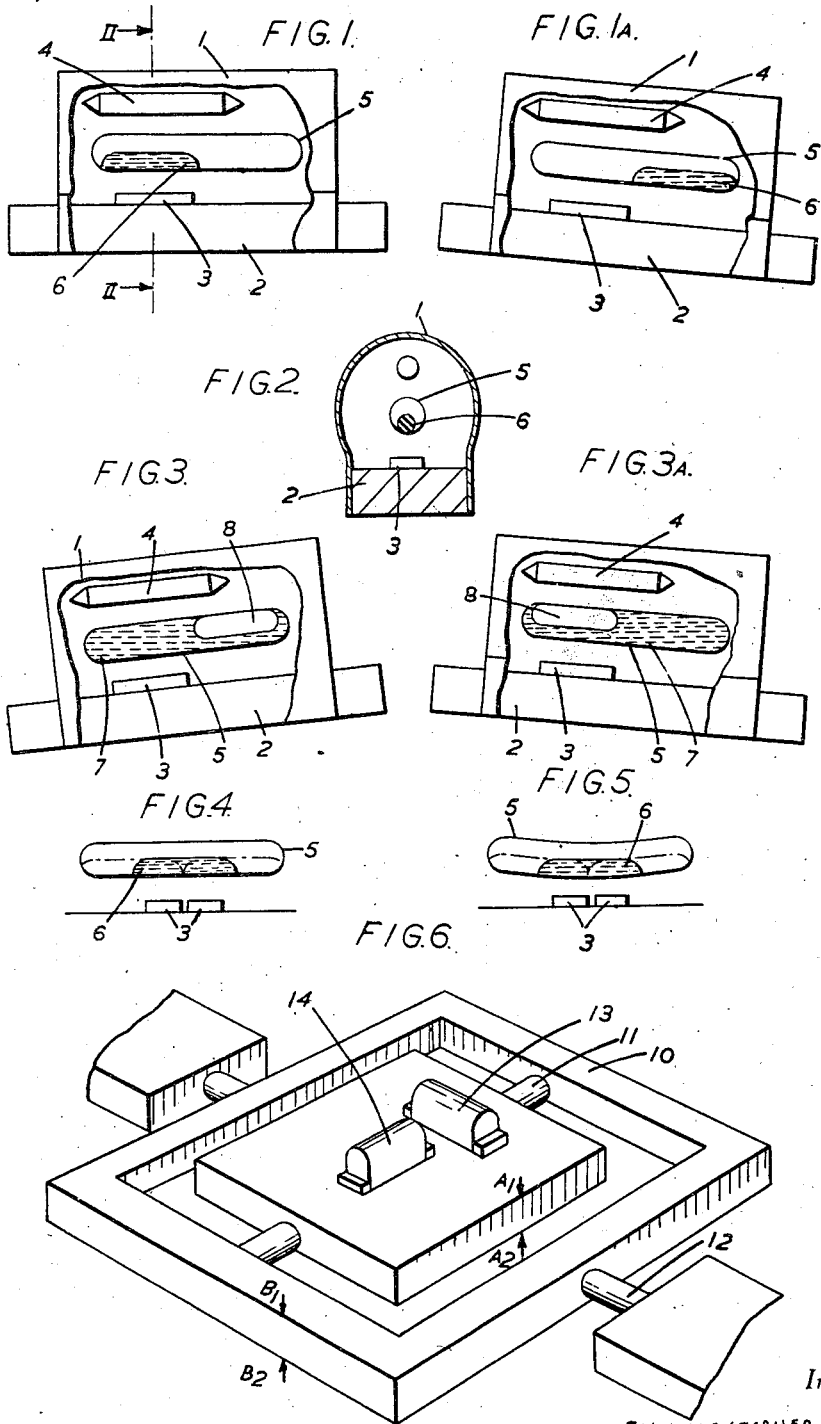
Inventor
JOHN CHRISTOPHER CLIFTON.
FREDERICK WESTERMAN ROBERTS
by Haseltine, Lake & Co
Attorneys.

Patented Sept. 23, 1947

2,427,902

UNITED STATES PATENT OFFICE 2,427,902

APPARATUS FOR THE GRAVITATIONAL CONTROL OF PHOTO AND ELECTRIC CELLS

John Christopher Clifton, New Eltham, London, and Frederick Westerman Rabarts, Bexley, England, assignors to Vickers-Armstrongs Limited, London, England, a company of Great Britain Application May 3, 1944, Serial No. 533,980
In Great Britain February 23, 1943

Section 1, Public Law 690, August 8, 1946.
Patent expires February 23, 1963

8 Claims. (Cl. 250—41.5)

The present invention relates to improved means for the control of photo-electric cells.

According to the present invention, the incidence of exciting light on a photo-electric cell is controlled by means of a gravitationally-operated opaque shutter, the movement of said opaque shutter under gravitational forces being adapted to expose the photo-electric cell to the exciting light or to screen the cell from said light.

Thus, means according to the present invention for controlling the operation of a photo-electric cell consist essentially of an opaque shutter interposed between the photo-electric cell and a source of exciting light for said cell and adapted to be moved under gravitational forces into a position to allow the exciting light to impinge upon the cell or to screen the cell from said light. The opaque shutter may be either liquid, solid, or combined liquid and gas. Thus, the shutter may consist of a limited quantity of an opaque liquid, such as mercury, which does not wet a transparent container which forms a channel for its movement. Alternatively, the container may be partially filled with a liquid so as to form a gas bubble therein, in such manner that when the bubble is disposed between the light source and the cell, the opacity of the interposed liquid is insufficient to prevent the exciting light impinging upon the cell. Again, the shutter may consist of a gravitationally-controlled solid body. Thus, a ball or other suitably shaped solid may be arranged for movement in a tube or suitable channel under the influence of gravitational forces.

A particular application of the invention consists of a method of stabilising a suspended system about a horizontal axis by including in the system at least one photo-electric cell, controlled as hereinbefore described, with the gravitationally-operated shutter moving in a plane at right angles to the axis of suspension of the system in such manner that movement of the shutter under gravitational forces consequent upon the movement of the system about its axis of suspension, is adapted either to expose or screen the cell to or from the exciting light, thereby to bring appropriate restoring forces into operation on the system.

The invention will now be described by way of example with reference to the accompanying diagrammatic drawings, in which:

Figure 1 is a side elevation of a device according to the invention with parts broken away;

Figure 1A is a similar view showing the device in a tilted position;

Figure 2 is a section on the line II—II of Figure 1;

Figure 3 is a fragmentary view of a modified form of the device;

Figure 3A is a similar view showing the device in a tilted position;

Figures 4 and 5 illustrate the control of two photo-electric cells by means of a single shutter, and Figure 6 illustrates the manner of using devices according to the invention for stabilising a suspended system.

Referring to Figures 1 and 2, a casing 1 is secured to a base 2 on which is mounted a photo-electric cell 3. Mounted within the casing in any convenient manner are a lamp 4, constituting a source of exciting light for the photo-electric cell, and a tube 5 within which is contained a limited quantity of mercury 6. The casing 1 constitutes a reflector for the lamp 4 and is part elliptical in section, and by disposing the lamp and the cell at the respective foci of the ellipse, it is possible to use a low power lamp thus avoiding undue heating of the mercury. Said mercury constitutes a gravitationally-operated opaque shutter and it will be seen that the tube 5 is in a horizontal position with the mercury 6 disposed between the lamp 4 and the photo-electric cell 3, and thus acting to prevent light from the lamp reaching the cell. As soon as the tube 5 is tilted downwardly at the right-hand end (as shown in Figure 1A), however, the mercury will move under gravity to that end of the tube, thus exposing the cell to the action of the exciting light.

A similar arrangement is shown in Figure 3, except that the tube 5, instead of containing a quantity of mercury, is partially filled with a liquid 7 so as to form a gas bubble 8 therein. As long as the tube remains slightly inclined upwardly to the right, the bubble 8 will remain at the right-hand end of the tube, and a layer of the liquid will be disposed between the lamp 4 and the photo-electric cell 3, of sufficient opacity to absorb the light from the lamp before it reaches the cell. As soon as the tube is tilted downwardly to the right-hand end, however, as shown in Figure 3A, the bubble 8 will move under gravity to the left-hand end of the tube thus reducing the opacity of the liquid layer sufficiently to allow the light from the lamp to impinge upon the cell.

Figures 4 and 5 illustrate the use of a single shutter for controlling two photo-electric cells. Thus, movement of the mercury to either end of the tube, as indicated in dotted lines, will expose one or other of the cells to the exciting light. As shown in Figure 5, the tube is slightly curved thus accurately centering the mercury when the tube is horizontal.

In balancing a system about a horizontal axis of suspension, a control device as hereinbefore described is included in the system with the gravitationally-operated shutter moving in a plane at right angles to the axis of suspension of the system.

When using a device according to Figure 1 or Figure 3, and while the photo-electric cell is screened from the exciting light, a force is applied to the system tending to tilt it so as to cause the mercury to move to the right-hand end of the tube, thus exposing the cell to the exciting light. As soon as this occurs, the current generated in the cell may be amplified and used to operate a relay in known manner to cut out said upsetting force and to bring into operation a restoring force which will, as soon as the tube has been tilted downwardly at the left-hand end sufficiently, restore the mercury to its obturating position, thus cutting out the restoring force and reapplying the upsetting force. The system will thus be in a continual state of oscillation about its axis of suspension to an extent depending upon the sensitivity of the gravitationally controlled shutter.

When using a device according to Figure 4 or Figure 5, both cells are screened from the exciting light while the system is horizontal. Tilting of the system in one or other direction about its horizontal axis however, will cause one or other of the cells to be exposed to the exciting light and the current generated by the cells may be amplified and used in known manner to bring appropriate restoring forces into operation on the system.

It will be appreciated that the manner of using the device according to the invention for applying or cutting out forces may be varied depending upon the particular requirements of the suspended system.

The manner of using devices according to the invention for balancing a suspended system about two mutually rectangular axes will be apparent from Figure 4.

The system comprises a platform 9 suspended from a frame 10 about an axis 11, the frame 10 being itself suspended about an axis 12 at right angles to the axis 11. The system is thus suspended about two mutually rectangular axes. A control unit 13 is mounted on the platform 9 at right angles to the axis of suspension 11 of platform 10 and is adapted to bring appropriate balancing forces $A_1$ and $A_2$ into action on the suspended system in the manner hereinbefore described. A control unit 14 is also mounted on platform 9 at right angles to the axis of suspension 12 of the frame 10, although it will be understood that the unit 14 may, if desired, be mounted on the frame 10, and is likewise adapted to bring appropriate balancing forces $B_1$ and $B_2$ into action on the suspended system.

We claim:

1. Means for controlling the incidence of light upon a photo-electric cell, comprising a transparent horizontal member formed with a channel therein disposed between said photo-electric cell and a source of exciting light therefor, and a limited quantity of an opaque substance located within said channel so as to screen said cell from the exciting light and free to move within said channel under gravitational forces when the member is tilted so as to allow the exciting light to impinge upon the cell.

2. Means for controlling the incidence of light upon a photo-electric cell, comprising a transparent horizontal member formed with a channel therein disposed between said photoelectric cell and a source of exciting light therefor, and a limited quantity of an opaque substance located within said channel so as to allow the exciting light to impinge upon the cell, and free to move within said channel under gravitational forces when said member is tilted so as to screen said cell from the exciting light.

3. Means for controlling the incidence of light upon a photo-electric cell, comprising a transparent horizontal tube disposed between said photo-electric cell and a source of exciting light therefor, and a limited quantity of mercury located within said tube at one end thereof so as to screen said cell from the exciting light and free to move within said tube under gravitational forces when the tube is tilted upwardly at said end so as to allow the exciting light to impinge upon the cell.

4. Means for controlling the incidence of light upon a photo-electric cell, comprising a transparent horizontal tube disposed between said photo-electric cell and a source of exciting light therefor, and a limited quantity of mercury located within said tube at one end thereof so as to allow the exciting light to impinge upon the cell and free to move within said tube under gravitational forces when the tube is tilted upwardly at said end so as to screen the cell from the exciting light.

5. Means for controlling the incidence of light upon a photo-electric cell, comprising a transparent horizontal tube disposed between said photo-electric cell and a source of exciting light therefore, and an opaque solid body located within said tube so as to screen said cell from the exciting light and free to move within said tube under gravitational forces when the tube is tilted so as to allow the exciting light to impinge upon the cell.

6. Means for controlling the incidence of light upon a photo-electric cell, comprising a transparent horizontal tube disposed between said photo-electric cell and a source of exciting light therefor, and an opaque solid body located within said tube so as to allow the exciting light to impinge upon the cell and free to move within said tube under gravitational forces when the tube is tilted so as to screen the cell from the exciting light.

7. Means for controlling the incidence of light upon a pair of photo-electric cells, comprising a transparent horizontal tube disposed between said photo-electric cells and a source of exciting light therefor, and a limited quantity of mercury located within said tube so as to screen one of said cells from the exciting light while allowing the exciting light to impinge upon the other of said cells, said quantity of mercury being free to move under gravitational forces when said tube is tilted to reverse the cells which are respectively screened from and exposed to said exciting light.

8. Means for controlling the incidence of light upon a pair of photo-electric cells, comprising a transparent horizontal tube disposed between said photo-electric cells and a source of exciting light therefor, and an opaque solid body located within said channel so as to screen one of said cells from the exciting light while allowing the exciting light to impinge upon the other of said cells, said solid body being free to move under gravitational forces when said tube is tilted to reverse the cells which are respectively screened from and exposed to said exciting light.

JOHN CHRISTOPHER CLIFTON.
FREDERICK WESTERMAN RABARTS.

REFERENCES CITED

The following references are of record in the file of this patent:

UNITED STATES PATENTS

| Number | Name | Date |
|---|---|---|
| 2,252,757 | Pepper | Aug. 19, 1941 |
| 2,202,987 | Egenos | June 4, 1940 |
| 1,724,870 | Belt | Aug. 13, 1929 |
| 2,193,315 | Evelyn | Mar. 12, 1940 |
| 2,205,254 | Gulliksen | June 18, 1940 |

FOREIGN PATENTS

| Number | Country | Date |
|---|---|---|
| 411,775 | Great Britain | June 14, 1934 |